Dec. 9, 1941.

C. J. CRANE ET AL 2,265,149

PHOTOELECTRIC DEVICE FOR OPENING OR CLOSING A
SWITCH AT ANY SELECTED ALTITUDE
Filed Jan. 27, 1941

INVENTORS
CARL J. CRANE
GEORGE V. HOLLOMAN
RAYMOND K. STOUT
BY
ATTORNEYS

Patented Dec. 9, 1941

2,265,149

UNITED STATES PATENT OFFICE 2,265,149

PHOTOELECTRIC DEVICE FOR OPENING OR CLOSING A SWITCH AT ANY SELECTED ALTITUDE

Carl J. Crane, Shreveport, La., and George V. Holloman and Raymond K. Stout, Dayton, Ohio Application January 27, 1941, Serial No. 376,168

3 Claims. (Cl. 250—41.5)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to barometric pressure responsive control devices and more particularly relates to a means whereby a control switch or switches may be actuated by a sensitive altimeter at respective preselected altitudes, to thereby initiate a desired control effect on the flight of an associated aircraft.

The device in accordance with the invention is of general application to control the opening or closing of a switch at preselected altitudes for any desired purpose, but is particularly adapted for use in conjunction with automatic or semi-automatic aircraft landing equipment where it is necessary to have a sensitive altimeter operative to cause a throttle control device to alter the engine power output at certain predetermined altitudes during the course of a descent.

It has already been suggested in the prior art to operate a switch including contacts closed by an altimeter to complete an electric circuit, but such a switch imposes great strains on the indicating mechanism of the altimeter since the contacts serve as stops for the pointer, and if the contacts are engaged with wiping action, the friction destroys the accuracy of indication of a sensitive instrument. Straining of the pointer and indicating mechanism also occurs in another known device where the pointer serves as a switch contact and is intermittently brought into engagement with any one of a plurality of fixed contacts arranged on the instrument dial. It is also known in the prior art to employ an indicating instrument with a rotatable dial or indicating element, having an aperture which permits a beam of light to pass therethrough to energize a photoelectric cell when the indicating element is in a predetermined position, the photoelectric cell being operative to energize or deenergize a control circuit through the medium of a relay. If, however, it is attempted to apply this principle to a conventional single pointer altimeter reading from zero to fifteen or twenty thousand feet, it will be found that the size of aperture necessary to pass a sufficient amount of light for operation of the photo cell will cover an appreciable amount of the space of a thousand foot interval, so that the response of the control device cannot be accurately confined to a particular altitude as measured by the altimeter within a small range of error and further, if it is attempted to utilize two such apertures located at a short interval apart in terms of altitude, such as at two hundred feet and at eight hundred feet, the resultant errors will be greatly increased due to the large portion of the interval between zero and one thousand feet on the dial, being occupied by the necessary apertures.

In order to overcome the difficulties present in the known prior art constructions it is proposed in accordance with the invention to employ a photoelectric means controlled by a sensitive altimeter to in turn control a relay or other switching device, thus avoiding imposing any friction or other loads on the altimeter indicating mechanisms. The invention further employs an altimeter of the well-known two pointer sensitive type and replaces the pointers by rotatable dials or shutters each having apertures therein which may be aligned at some predetermined altitude or altitudes to allow light from a source such as a lamp to pass therethrough and impinge on the light sensitive surface of a photoelectric cell which then becomes operative to energize a control relay. The two pointer type of altimeter, as well-known in the art is constructed so that one pointer rotates to indicate hundreds of feet, while the other pointer indicates thousands of feet, the hundred foot pointer thus making ten complete revolutions for one complete revolution of the thousand foot interval pointer. By placing one or more apertures in the disc or dial operated by the hundred foot pointer shaft, it is possible to make an aperture of sufficient width to pass the requisite amount of light through an aperture in the disc or dial actuated by the thousand foot pointer shaft and yet have the altitude change, corresponding to a movement of the aperture from the light admitting position to the cut off position, be as small as ten feet. Each of the discs serves as a shutter for the other, so that with a sequence of operations of the relay at say two hundred and eight hundred feet, the photocell will not again be energized until the thousand foot disc has rotated through a complete revolution which is ten thousand feet, which is beyond the range in which the device is intended to be used.

The principal object of the invention is the provision in combination with a barometric pressure responsive indicating instrument having two pointer shafts rotatable relative to each other in a predetermined ratio, of a pair of apertured discs each mounted on a respective one of said pointer shafts, the said apertures being aligned in one predetermined relative position of the discs to permit light to pass from a source placed on one side of said discs to a light sensitive cell placed on the opposite side of the discs, the light sensitive cell being operative to control an electric circuit controlling device.

Other objects of the invention not specifically pointed out above will become apparent to those skilled in the art by reference to the detailed description in the specification and to the appended drawing in which.

Figure 1:
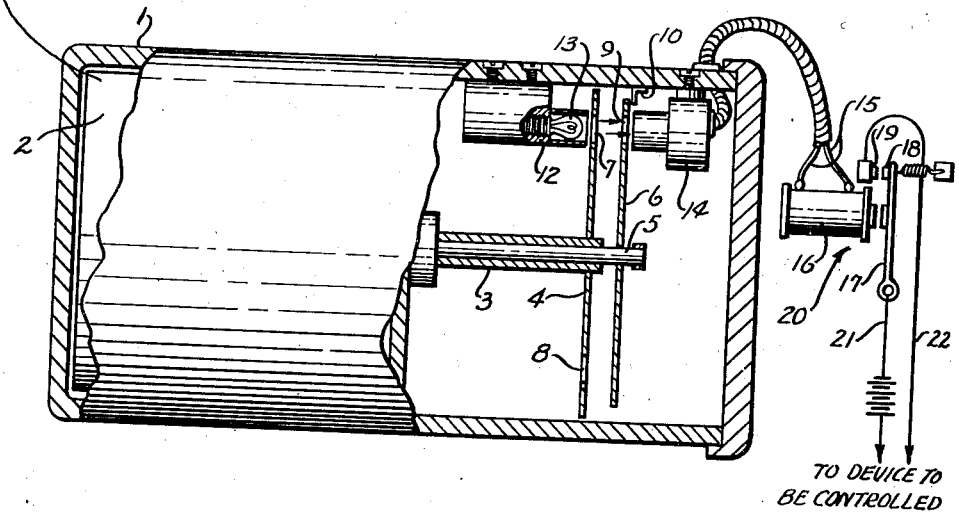
Fig. 1 illustrates a side elevation partly in section of the elements of the invention.

Referring now to Fig. 1, the reference numeral 1 denotes a cylindrical housing containing therein a sensitive altimeter 2 of the well-known two pointer type, one example of such an altimeter being shown in the U. S. Patent No. 2,024,313 granted to Adolf Urfer. The altimeter is provided with a hollow shaft 3 actuated by the altimeter indicating mechanism (not shown) so that it makes one complete revolution for a one thousand foot change of altitude. A disc 4 is rigidly secured to the shaft 3, and is rotatable therewith. A shaft 5 is concentrically arranged within the hollow shaft 3 and extends beyond the end of shaft 3, the shaft 5 also being actuated by the altimeter indicating mechanism so that the shaft makes, for example one complete revolution within the altitude range from zero to ten thousand feet. A disc 6 is rigidly mounted on the shaft 5 adjacent its outer end and is rotatable therewith, the discs 4 and 5 preferably being provided with suitable altitude indicia thereon and adapted to cooperate with a stationary reference pointer 10 for calibration or checking purposes. The discs 4 and 5 in effect constitute rotatable dials respectively angularly positioned by the indicating mechanism of the altimeter in accordance with the instant pressure altitude relation. The disc 4 is provided with one or more apertures in the form of narrow slits 7 and 8 respectively, and the disc 6 is similarly provided with an enlarged aperture 9. A light source 12 including a lamp 13 is located on one side of the disc assembly and directly opposite a photoelectric cell 14, arranged on the opposite side of the disc assembly. The photoelectric cell 14 is preferably of the Photronic type which generates sufficient current to operate a relay without the use of a local battery and is electrically connected by means of conductors 15 to the coil 16 of a sensitive electrical relay generally indicated by the reference numeral 20. The relay 20 is provided with a pivoted relay arm 17, having an electrical contact 18 mounted thereon and adapted to engage a stationary contact 19. The relay arm 17 is suitably biased by a spring so that the contacts 18 and 19 are normally disengaged and brought into engagement whenever the coil 16 is sufficiently energized by the current generated by the photoelectric cell 14, to attract the relay arm 17 against the yielding resistance of the spring. The contacts 17 and 18 are respectively electrically connected to the conductors 21 and 22; and form a part of a suitable electrical control circuit not shown, which may be utilized for any desired purpose such as the sequential operation of a switch or the like to control a throttle positioning servomotor. It is of course obvious that the relay 20 may be employed to deenergize an electric circuit by arranging contacts 18 and 19 to normally be engaged and to be opened upon relay coil 16 becoming energized. The discs 4 and 6 respectively serve as shutters to intercept the light projected by the lamp 13, until apertures in each of the discs become registered with each other and with the beam of light transmitted from the light source which can then pass through the aligned apertures and strike the photosensitive surface of the photoelectric cell 14. The photoelectric cell 14, upon becoming energized develops sufficient current to actuate the sensitive relay 20 as previously explained.

Figure 3:
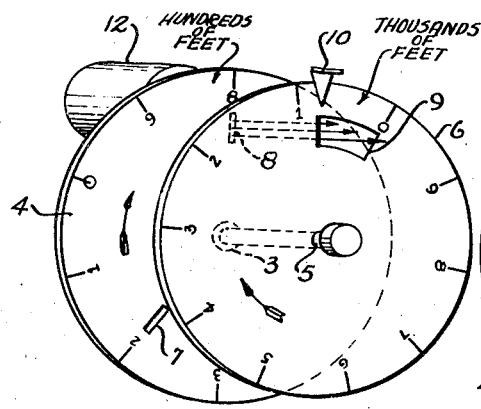
Fig. 3 illustrates in perspective a second operative position of the rotatable shutters of the device of Fig. 1.
Figure 2:
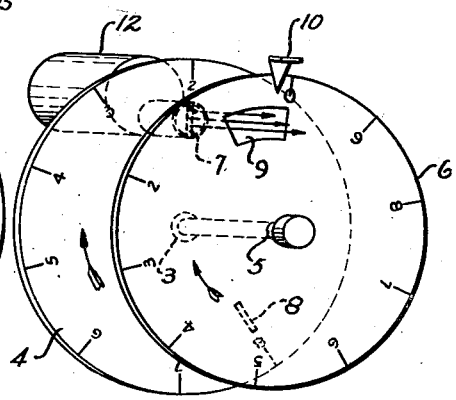
Fig. 2 illustrates in perspective one operative position of the rotatable shutters or dials of the device of Fig. 1.
Figure 4:
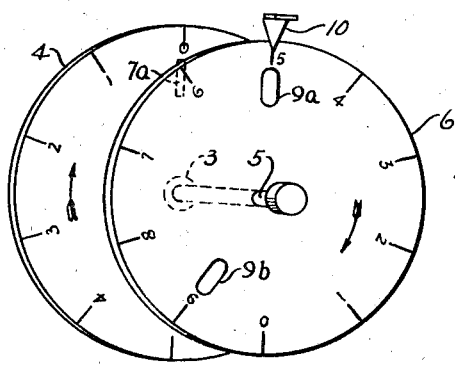
Fig. 4 illustrates a further disposition of the apertures of the shutters of the device of Fig. 1 where the predetermined altitude for operation of the relay exceeds one thousand feet.

Figures 2 and 3 illustrate the arrangement of the apertures in the respective discs 4 and 6 respectively where it is desired to have the relay 20 actuated at two different predetermined altitudes each less than a thousand feet, for example 200 and 800 feet respectively. The disc 4 is pierced by apertures 7 and 8 which may be of rectangular shape and located on radial lines opposite the two hundred and eight hundred feet indicia respectively. The disc 6 or thousands dial is provided as shown with a single arcuate aperture 9 extending from the two hundred foot to the eight hundred foot portion of the dial interval from zero to one thousand feet. The single aperture 9, however, may be made in the form of two separate spaced apertures, the single aperture being used simply because of the close spacing of the predetermined altitude intervals. If the discs or dials 4 and 6 are rotated clockwise by the altimeter indicating mechanism from the zero position to the position shown in Fig. 2, the aperture 7 on the disc 4 opposite the two hundred foot indicia will have rotated until it is aligned with the beam of light transmitted from the light source 12 and the arcuate aperture 9 on the disc 6 will also have rotated into register with the beam of light allowing the light to pass through the apertures to impinge on the photo cell 14 of Fig. 1, and causing the same to become energized. In the interval from two hundred feet to eight hundred feet the aperture 7 moves out of register with the beam of light and the beam is cut off by the disc 4 until the aperture 8 opposite the eight hundred foot indicia on disc 4 is in register with the beam of light, as seen in Fig. 3. The disc 6 in the meantime has rotated clockwise an angular distance of eight tenths of a thousand foot interval but leaving the arcuate aperture 9 still in register with the light beam, so that at eight hundred feet altitude the light beam can again pass through the aligned apertures to impinge on the photoelectric cell 14 (Fig. 1). It will be seen that as the discs 4 and 6 rotate clockwise with increase of altitude the apertures 7 and 8 will become aligned respectively with the aperture 9 once each revolution of the disc 4 or once in every thousand feet, but the apertures 7 and 9 will not become aligned with each other and in register with the beam of light until the disc 6 has made a complete revolution, which will occur at an altitude of 10,200 feet and similarly the apertures 8 and 9 will not again register with the beam of light until the altimeter reads 10,800 feet. All the purposes for which the device is to be operative, for example, automatic instrument landing control, are intended to occur at altitudes less than ten thousand feet. It will be understood from the above description that since the disc 4 is rotated for a given change in altitude an amount in the example illustrated of ten times the angular displacement of the disc 6, the size of the apertures in the disc 4 may be made such, that ample light may pass therethrough to energize the photocell and yet be cut off in as little as a ten or twenty foot change of altitude.

Where for any reason it may be desired to actuate the relay 20 at altitudes in excess of one thousand feet for example at five and nine thousand feet respectively, the disc 6, as seen in Fig. 4 is provided with apertures 9a and 9b located in radial alignment with the corresponding altitude indicia respectively and the disc 4 is provided with a single aperture 7a located in radial alignment with the zero indication. The light beam can then pass through the disc apertures at altitudes of five and eight thousand feet respectively and the apertures will not again come into registry with the light beam until altitudes of fifteen and nineteen thousand feet are reached respectively.

By suitably locating the apertures in the discs it is possible to cause actuation of the photoelectric relay at any one or more predetermined altitudes, the device in no way being limited to the two preselected altitudes illustrated, since regardless of the number of preselected altitudes desired, the discs will not again repeat the sequence of registrations of apertures with the light beam until the dial 6 has made a complete revolution from the last respective register of the particular apertures.

While a preferred form of the invention has been illustrated and described, other variations and modifications will become apparent to those skilled in the art as falling within the scope of the invention as defined by the appended claims.

We claim:

1. A barometric pressure responsive control device comprising a sensitive altimeter having two indicator actuating shafts, one of said shafts being rotatable through a greater angular displacement than the other of said shafts for a given change in barometric pressure and the relative displacement of said shafts being in a predetermined ratio, a pair of apertured concentric discs each rotated by a respective one of said shafts and the apertures in said discs being in alignment in a predetermined position of said discs corresponding to a predetermined altitude, a light source, a photoelectric cell arranged to receive light from said source, said discs being arranged in the path of light from said source to said photoelectric cell and operative in the said predetermined position of said discs to permit light to pass through the said apertures and impinge on the light sensitive element of said photoelectric cell, an electric circuit including a control relay operatively connected to said cell and energized when light from said source is transmitted to said photoelectric cell.

2. The structure as claimed in claim 1, in which one of said discs is provided with at least one aperture and the other of said discs is provided with a plurality of apertures, the apertures in said discs being arranged so that light from said source may pass therethrough at different predetermined relative positions of said discs corresponding to predetermined altitudes.

3. In combination a sensitive altimeter including a first shaft angularly positioned in accordance with the instant pressure altitude relation and a second shaft rotatable through an angle equal to a predetermined multiple of the displacement of said first shaft for the same pressure altitude relation, a photoelectric relay, a light source adapted to transmit a beam of light to the photosensitive element of said relay, a pair of shutter elements each respectively associated with one of said shafts, said shutter elements being arranged in overlapping relation in the line of transmission of light from said source to the photosensitive element of said relay, and a light transmitting aperture in each of said shutter elements adapted to be in register with each other and with said beam of light in a predetermined relative position of said altimeter shafts.

CARL J. CRANE.
GEORGE V. HOLLOMAN.
RAYMOND K. STOUT.